3,076,854
RECOVERY OF TRIMETHYLOLPROPANE
David X. Klein, Upper Montclair, N.J., assignor to Heyden Newport Chemical Corporation, a corporation of Delaware
No Drawing. Filed Dec. 5, 1955, Ser. No. 550,847
7 Claims. (Cl. 260—637)

The present invention relates to a novel process for recovering trimethylolpropane of high purity from aqueous reaction liquors which contain in addition to the trimethylolpropane a large amount of various impurities.

Trimethylolpropane may be made by condensing one mole of n-butyraldehyde with about 3 moles of formaldehyde in an aqueous medium and in the presence of an alkaline condensation catalyst. This reaction is illustrated by the following equation:

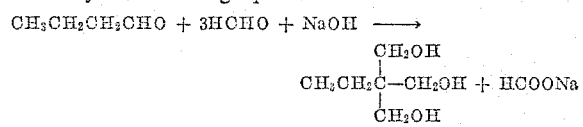

Other alkaline condnesation catalysts may be used although the strongly alkaline compounds such as sodium hydroxide or calcium oxide or calcium hydroxide are preferred. Customarily an excess of both formaldehyde and catalyst are used to increase the yield based on the amount of n-butyraldehyde charged to the reaction. After the reaction is complete, the excess sodium hydroxide or other catalyst, if any, is neutralized with acid such as formic acid, sulphuric acid, hydrochloric acid or other strong acid.

While the above equation illustrates the course of the reaction, other side reactions are involved. The aqueous reaction liquor, in addition to containing one mole of sodium formate or a half mole of calcium formate for each mole of trimethylolpropane produced, contains an appreciable quantity of other impurities including color bodies and syrupy by-products which are various polyhydric compounds including trimethylolpropane formals. Recovering trimethylolpropane of high purity from the aqueous reaction liquor presents a very serious problem. Trimethylolpropane cannot be recovered by concentration of the reaction liquor followed by precipitation of the trimethylolpropane as is practiced in recovering pentaerythritol from its aqueous reaction liquors. Concentration of the trimethylolpropane reaction liquor by evaporation of the water merely produces a viscous mass and it is impossible to precipitate trimethylolpropane from such a liquor.

It has been proposed that various solvents such as water soluble alcohols and acetone be used for extracting trimethylolpropane from the aqueous reaction liquor or from the residue left after removing part or substantially all of the water from the liquor. However, the product obtained in this manner is not a white product of crystalline nature which is substantially free of metal formate and polyhydric by-products. The trimethylolpropane obtained in this manner contains from about 1 to 4% by weight of metal formate and contains an appreciable quantity of polyhydric by-products. The presence of these polyhydric by-products is highly undesirable and their presence is indicated by the suppression of the congealing point of the trimethylolpropane.

I have discovered a novel process for efficiently recovering trimethylolpropane of high purity from such a reaction liquor. More particularly, my process comprises extracting the reaction liquor with a particular solvent and then extracting the solvent extract with water to form an aqueous re-extract containing in solution trimethylolpropane contaminated with some polyhydric by-products and metal formate. Trimethylolpropane having a congealing point above 50° C. is obtained by treating the re-extracted contaminated trimethylolpropane with hot methanol in the presence of a strong acid. The acidic methanol treatment may be carried out by adding methanol and acid to the aqueous re-extract and then heating this mixture. Alternatively, this treatment may be carried out by first separating the contaminated trimethylolpropane from the aqueous re-extract and thereafter heating the separated trimethylolpropane with methanol and acid. The methanol-acid treatment hydrolyzes the formals present and results in a product which has a congealing point above 50° C. The re-extracted trimethylolpropane while in aqueous solution also is contacted with both cation and anion exchange resins to remove the residual metal salt. The ion exchange resin treatment is preferably carried out after the methanol-acid treatment. In this manner trimethylolpropane can be recovered containing less than 0.1% metal salt.

The trimethylolpropane is first extracted from the reaction liquor by intimately contacting the reaction liquor with a liquid water immiscible solvent for trimethylolpropane. While the preferred solvent is normal butanol, amyl alcohol or mixtures thereof, the term "amyl alcohol" including the various isomers of this alcohol, other liquid solvents may be used provided that the solvent is sufficiently water immiscible to separate from the stripped aqueous liquor. The solvent should be liquid at room temperature. Illustrative other extraction solvents are ethyl acetate, isopropyl acetate, methyl isobutyl ketone, methyl amyl ketone, hexyl alcohol, cyclohexanol, furfuryl alcohol, benzyl alcohol and mixtures thereof. However, the best solvent is a mixture of primary and secondary amyl alcohols which may or may not contain a minor amount of tertiary amyl alcohol. The solvent extract can be readily separated from the stripped liquor. This extract contains trimethylolpropane plus an appreciable amount of color bodies as well as metal formate along with polyhydric by-products. The amount of solvent used to extract the aqueous reaction liquor is preferably somewhat larger than the amount of liquor. The amount of solvent can be varied widely depending in part on the particular solvent used. Preferably, the aqueous reaction liquor is concentrated prior to extraction by evaporation of part of the water to reduce the amount of solvent required. Generally, the reaction liquor will contain at least about 10% by weight of trimethylolpropane and if the reaction liquor is concentrated, it may contain up to about 35% trimethylolpropane. The reaction liquor is not concentrated to the point where any appreciable quantity of the metal formate or other material is precipitated. Thus, the reaction liquor at the time of solvent extraction contains substantially all of the reaction products in solution, regardless of whether or not the liquor has been concentrated.

The solvent extract is then mixed or intimately contacted with water to form an aqueous re-extract which can be readily separated from the stripped solvent. The aqueous re-extract contains in solution trimethylolpropane contaminated with impurities including metal formate and polyhydric by-products. The amount of water used for re-extracting the trimethylolpropane from the solvent is usually not critical. Normally, this amount of water will be somewhat less than the amount of solvent extract. An emulsion may form when extracting the reaction liquor with the solvent or when re-extracting the solvent extract with water. Such an emulsion does not readily separate into two phases. However, if such an emulsion occurs, it can be readily overcome by increasing the amount of extracting medium, either solvent or water, as the case may be.

The crude trimethylolpropane dissolved in the aqueous re-extract is contaminated with both metal formate and polyhydric by-products. In order to reduce contamination of the trimethylolpropane by the polyhydric by-products, the trimethylolpropane is heated with methanol in the presence of a strong acid. While methanol is the preferred alcohol, other lower, aliphatic monohydric alcohols, for example, ethanol, propanol, or butanol may be used. The amount of methanol added should be at least as large as the amount of polyhydric by-products present and preferably an excess of methanol is used. Any strong mineral acid such as hydrochloric, sulphuric, nitric or phosphoric acid may be used to reduce the pH value of the mixture to a value of 4 or less. In order to achieve this pH value, the amount of added acid is slightly in excess of the amount required to convert the metal formate to a metal salt of the added acid. This conversion is illustrated by the following equation for sodium formate and hydrochloric acid:

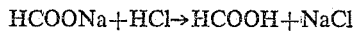
$$HCOONa + HCl \rightarrow HCOOH + NaCl$$

The methanol and acid may be added to the aqueous re-extract. Alternatively, the crude trimethylolpropane contaminated with the polyhydric by-products may be separated from the re-extract by, for example, evaporating the re-extract to dryness. This crude trimethylolpropane can then be mixed with the methanol and acid. In either procedure the mixture including the crude trimethylolpropane, methanol and acid is heated to hydrolyze the trimethylolpropane formals, thereby eliminating at least part of the polyhydric by-products. The temperature at which the mixture is heated is not critical. In general, higher temperatures require a shorter period, while the lower temperatures require a longer heating period. In practice the mixtures may be heated, for example, to 50° C. or to the reflux temperature.

In order to obtain a product containing less than 0.1% of metal salt, calculated as metal formate, the re-extracted trimethylolpropane is treated while dissolved in water ion-exchange material. This treatment preferably but not necessarily follows the methanol-acid treatment. Thus, the metal salts may be present in the aqueous trimethylolpropane solution as metal formate or as a metal salt of the acid used during the methanol treatment or as a mixture of such salts. Regardless of the particular salt actually present, the salt is customarily referred to and considered as sodium or calcium formate. Preferably, the ion exchange treatment includes treatment with both cation exchange material and anion exchange material such as cation and anion exchange resins. The acidic cation exchange material capable of being regenerated with acid and capable of removing the metal ions may be, for example, a nuclear sulfonated styrene-divinyl benzene copolymer, a phenolformaldehyde condensation product or other cation exchange resins. The basic anion exchange material capable of removing the acidic ions and capable of being regenerated with a base may be, for example, a meta-phenylenediamine-formaldehyde condensation product or other anion exchange resin. The method of treating the trimethylolpropane comprises contacting an aqueous solution of re-extracted trimethylolpropane with the ion exchange materials, either simultaneously or separately and either by flowing the aqueous solution through a bed of the granular ion exchange materials or by suspending the granular exchange materials in the solution.

The following examples illustrate the present invention. Throughout this application including the accompanying claims all percentages are by weight.

*Example 1*

A mixture was formed by adding 270 grams (2.2 moles) of 32.5% aqueous sodium hydroxide over a fifteen minute period to 975 grams (6.5 moles) of 20% methanol-free aqueous formaldehyde. This mixture was cooled to 20° C. and then 152.2 grams (2.0 moles) of 95% n-butyraldehyde was added over a period of one hour and at such a rate that the temperature at the end of the addition was 30° C. The mixture was stirred at 25–30° C. for one hour, and the reaction liquor was treated with 5.7 grams of 90% formic acid to neutralize the excess sodium hydroxide. In this manner there was obtained 1180 grams of neutralized reaction liquor having a pH value of 6 and containing 15.9% trimethylolpropane and 0.4% formaldehyde. This reaction liquor was concentrated by evaporation at 15 mm. to a weight of 590 grams. Reaction liquor prepared in this manner was then extracted as hereinafter described.

The double extraction was carried out in two parallel packed columns with solvent being the continuous phase in the first column while water was the continuous phase in the second column. The solvent used was a commercial grade of amyl alcohol which consisted primarily of a mixture of primary and secondary amyl alcohols plus a small amount of tertiary amyl alcohol. The first column was filled with amyl alcohol and then amyl alcohol was pumped into the lower portion of this first column at the rate of 2257 grams per hour while at the same time aqueous reaction liquor was fed into the upper portion of the column at the rate of 1128 grams per hour. At equilibrium the solvent extract was removed from the top of the column at the rate of 2667 grams per hour while the stripped aqueous liquor was removed from the bottom of the first column at the rate of 685 grams per hour. The solvent extract from the top of the first column was fed to an intermediate storage tank and then from the storage tank into the lower portion of the second column at the rate of 1723 grams per hour. At the same time water was fed into the upper portion of the second column at the rate of 988 grams per hour. At equilibrium the aqueous re-extract was removed from the bottom of the second column at the rate of 1232 grams per hour while the stripped solvent was removed from the top of the second column at the rate of 1454 grams per hour. This stripped solvent may be recycled for extracting a further quantity of reaction liquor.

A one kilogram portion of this aqueous re-extract was concentrated by evaporation under partial vacuum to 500 grams. Thereafter 40 grams of methanol and 14.2 grams of 36% hydrochloric acid were added to the concentrated re-extract. This mixture was heated at the reflux temperature for 2 hours and then cooled to room temperature.

The cooled mixture was then passed at the rate of 10 ml. per minute through a column of 155 grams of granular ion exchange material comprising cation exchange resin and anion exchange resin. The cation exchange resin was an acidic nuclear sulfonated styrene-divinyl benzene copolymer, while the anion exchange resin was a basic meta-phenylenediamine-formaldehyde polymer. Thereafter 250 grams of wash water was passed through the column to remove the trapped liquor. The column effluents were combined and evaporated to dryness under reduced pressure at 70–75° C. The dried product which was trimethylolpropane of high purity weighed 171 grams and contained 0.06% metal salt calculated as sodium formate.

The high purity trimethylolpropane had a congealing temperature of 51.5° C. In a comparative run where the meathanol-acid treatment was omitted, the product had a congealing temperature of 47° C. showing the presence of an unduly large amount of polyhydric by-products. The congealing temperature is obtained by melting a small quantity of the trimethylolpropane and then cooling the molten trimethylolpropane to a temperature slightly below the expected congealing temperature. A few seed crystals of trimethylolpropane are added, and the temperature is observed substantially constantly. Upon the addition of the seed crystals, the temperature will rise slightly to a plateau and remain constant until the trimethylolpropane has crystallized into a solid mass. This constant or plateau temperature is the congealing point.

*Example 2*

A kilogram of aqueous re-extract prepared as described in Example 1 but not concentrated was heated and evaporated to dryness under reduced pressure. The residue, consisting of trimethylolpropane, an appreciable quantity of polyhydric by-products and a small quantity of sodium formate, weighed 175 grams. This residue was mixed with 200 ml. of methanol and 20 ml. of concentrated hydrochloric acid. The solution was refluxed for two hours. Thereafter the solution was evaporated to dryness. The residue was dissolved in one liter of water and this aqueous solution was deionized in the same manner as described in Example 1. The column effluent was evaporated to dryness under reduced pressure. The purified trimethylolpropane product weighed 164 grams, contained 0.06% metal salt calculated as metal formate and had a congealing temperature of 54.4° C. The 164 grams of trimethylolpropane constituted a yield of 78% based on the quantity of n-butyraldehyde charged to the reaction.

Various modifications may be made in the present process without department from its spirit or scope. The process may be carried out continuously or batchwise. The stripped solvent may be recycled for extracting an additional quantity of reaction liquor. Deionization, that is, removal of the metal salts, may be carried out prior to the methanol-acid treatment. However, this procedure has the disadvantage that the added acid is not removed by a subsequent treatment with ion exchange resins. It is not practical or feasible to subject the reaction liquor to either the methanol-acid treatment or the ion exchange resin treatment. When the trimethylolpropane is to be used under conditions where the presence of metal salts is not particularly objectionable, although such a condition would be an exception to the general rule that it is highly desirable to have the metal salt content very low, then the ion exchange treatment may be omitted with a corresponding decrease in the quality of the product.

I claim:

1. A process for the recovery of high purity trimethylolpropane from an aqueous reaction liquor containing in solution trimethylolpropane and impurities including metal formate and polyhydric by-products produced by condensation of n-butyraldehyde and formaldehyde in an aqueous medium containing an alkaline condensation catalyst, the process comprising extracting such a reaction liquor with water immiscible solvent selected from the group consisting of n-butyl alcohol and amyl alcohol to form a solvent extract containing trimethylolpropane, metal formate and polyhydric by-products, separating the solvent extract from the stripped liquor, re-extracting the solvent extract with water to form an aqueous re-extract containing re-extracted trimethylolpropane contaminated with metal formate and polyhydric by-products, separating the aqueous re-extract from the stripped solvent, thereafter treating the re-extracted contaminated trimethylolpropane with methanol and a mineral acid to hydrolyze polyhydric by-products, thereafter contacting an aqueous solution of the methanol-acid treated trimethylolpropane while dissolved in water with basic anion exchange resin and acidic cation exchange resin to remove metal salt from the solution.

2. A process for the recovery of high purity trimethylolpropane from an aqueous reaction liquor containing in solution trimethylolpropane and impurities including sodium formate and polyhydric by-products produced by condensation of n-butyraldehyde and formaldehyde in an aqueous medium containing sodium hydroxide as a condensation catalyst, the process comprising extracting such a reaction liquor with water immiscible solvent selected from the group consisting of n-butyl alcohol and amyl alcohol to form a solvent extract containing trimethylolpropane, sodium formate and polyhydric by-products, separating the solvent extract from the stripped liquor, re-extracting the solvent extract with water to form an aqueous re-extract containing re-extracted trimethylolpropane contaminated with sodium formate and polyhydric by-products, separating the aqueous re-extract from the stripped solvent, thereafter heating the re-extracted contaminated trimethylolpropane with methanol and a mineral acid to hydrolyze polyhydric by-products, and, thereafter contacting an aqueous solution of the methanol-acid treated trimethylolpropane while dissolved in water with basic anion exchange resin and acidic cation exchange resin to remove sodium salt from the solution.

3. A process for the recovery of trimethylolpropane from an aqueous reaction liquor containing in solution trimethylolpropane and impurities including metal formate and polyhydric by-products produced by condensation of n-butyraldehyde and formaldehyde in an aqueous medium containing an alkaline condensation catalyst, the process comprising extracting such a reaction liquor with water immiscible solvent selected from the group consisting of n-butyl alcohol and amyl alcohol to form a solvent extract containing trimethylolpropane, metal formate and polyhydric by-products, separating the solvent extract from the stripped liquor, re-extracting the solvent extract with water to form an aqueous re-extracting containing re-extracted trimethylolpropane contaminated with metal formate and polyhydric by-products, separating the aqueous re-extract from the stripped solvent, thereafter heating the re-extracted contaminated trimethylolpropane with methanol and a mineral acid whereby the congealing temperature of the trimethylolpropane is raised to a temperature above 50° C.

4. A process for the recovery of high purity trimethylolpropane from an aqueous reaction liquor containing in solution trimethylolpropane and impurities including sodium formate and polyhydric by-products produced by condensation of n-butyraldehyde and formaldehyde in an aqueous medium containing sodium hydroxide as a condensation catalyst, the process comprising extracting such a reaction liquor with water immiscible solvent selected from the group consisting of n-butyl alcohol and amyl alcohol to form a solvent extract containing trimethylolpropane, sodium formate and polyhydric by-products, separating the solvent extract from the stripped liquor, re-extracting the solvent extract with water to form an aqueous re-extract containing re-extracted trimethylolpropane contaminated with sodium formate and polyhydric by-products, separating the aqueous re-extract from the stripped solvent, evaporating the water from the aqueous re-extract to form a dried contaminated trimethylolpropane residue, and, dissolving the trimethylolpropane residue in methanol in the presence of more mineral acid than is required to convert the sodium formate to the sodium salt of said mineral acid and heating the resulting solution to the reflux temperature.

5. A process for the recovery of high purity trimethylolpropane from an aqueous reaction liquor containing in solution trimethylolpropane and impurities including sodium formate and polyhydric by-products produced by condensation of n-butyraldehyde and formaldehyde in an aqueous medium containing sodium hydroxide as a condensation catalyst, the process comprising extracting such a reaction liquor with water immiscible solvent selected from the group consisting of n-butyl alcohol and amyl alcohol to form a solvent extract containing trimethylolpropane, sodium formate and polyhydric by-products, separating the solvent extract from the stripped liquor, re-extracting the solvent extract with water to form an aqueous re-extract containing trimethylolpropane contaminated with sodium formate and polyhydric by-products, separating the aqueous re-extract from the stripped solvent, evaporating the water from the aqueous re-extract to form a dried contaminated trimethylolpropane residue, dissolving the trimethylolpropane residue in methanol in the presence of more mineral acid than is required to convert the sodium salt to the sodium salt of the acid and heating the resulting solution to the reflux temperature, thereafter evaporating the methanol from the heated solution to form a dried trimethylolpropane residue containing sodium salt, and dissolving the last-mentioned trimethylolpropane residue in water and contacting the resulting aqueous solution with acidic cation exchange resin and basic anion exchange resin to deionize the solution.

6. A process for the recovery of high purity trimethylolpropane from an aqueous reaction liquor containing in solution trimethylolpropane and impurities including sodium formate and polyhydric by-products produced by condensation of n-butyraldehyde and formaldehyde in an aqueous medium containing sodium hydroxide as a condensation catalyst, the process comprising extracting such a reaction liquir with water immiscible solvent selected from the group consisting of n-butyl alcohol and amyl alcohol to form a solvent extract containing trimethylolpropane, sodium formate and polyhydric by-products, separating the solvent extract from the stripped liquor, re-extracting the solvent extract with water to form an aqueous re-extract containing trimethylolpropane contaminated with sodium formate and polyhydric by-products, separating the aqueous re-extract from the stripped solvent, adding to the aqueous re-extract an amount of methanol at least as large as the amount of polyhydric by-products and sufficient mineral acid to adjust the pH of the re-extract solution to a value at least as low as 4, and thereafter heating the re-extract solution to its reflux temperature.

7. A process for the recovery of high purity trimethylolpropane from an aqueous reaction liquor containing in solution trimethylolpropane and impurities including sodium formate and polyhydric by-products produced by condensation of n-butyraldehyde and formaldehyde in an aqueous medium containing sodium hydroxide as a condensation catalyst, the process comprising extracting such a reaction liquor with water immiscible solvent selected from the group consisting of n-butyl alcohol and amyl alcohol to form a solvent extract containing trimethylolpropane, sodium formate and polyhydric by-products, separating the solvent extract from the stripped liquor, re-extracting the solvent extract with water to form an aqueous re-extract containing trimethylolpropane contaminated with sodium formate and polyhydric by-products, separating the aqueous re-extract from the stripped solvent, adding to the aqueous re-extract an amount of methanol at least as large as the amount of polyhydric by-products and sufficient mineral acid to adjust the pH of the re-extract solution to a value at least as low as 4, thereafter heating the re-extract solution to its reflux temperature, thereafter contacting the aqueous re-extract solution with acidic cation exchange resin and basic anion exchange resin to remove sodium salt, and recovering from the resin treated aqueous solution high purity trimethylolpropane having a congealing temperature above 50° C. and containing less than 0.1% by weight of sodium salt calculated as sodium formate.

References Cited in the file of this patent

UNITED STATES PATENTS

| | | |
|---|---|---|
| 2,135,063 | Walker et al. | Nov. 1, 1938 |
| 2,420,496 | Poitras et al. | May 13, 1947 |
| 2,479,041 | Elgin | Apr. 16, 1949 |
| 2,533,737 | Mertz | Dec. 12, 1950 |
| 2,629,746 | Cox | Feb. 24, 1953 |
| 2,806,889 | Gottesman et al. | Sept. 17, 1957 |

FOREIGN PATENTS

| | | |
|---|---|---|
| 108,236 | Australia | Aug. 9, 1939 |
| 686,254 | Great Britain | Jan. 21, 1953 |
| 1,081,691 | France | June 9, 1954 |
| 730,759 | Great Britain | May 25, 1955 |